United States Patent [19]

Yamashita et al.

[11] Patent Number: 4,941,245

[45] Date of Patent: Jul. 17, 1990

[54] ROTARY FILE, SUPPORT MEMBER AND ABRASIVE DEVICE

[75] Inventors: Teruaki Yamashita; Hirokazu Naka, both of Iwata, Japan

[73] Assignee: Yamaha Hatsudoki Kabushiki Kaisha, Shuzuoka, Japan

[21] Appl. No.: 340,516

[22] Filed: Apr. 19, 1989

[30] Foreign Application Priority Data

Apr. 28, 1988 [JP] Japan .................................. 63-106763

[51] Int. Cl.$^5$ ...................... B23D 67/06; B23D 71/02; B24D 7/00
[52] U.S. Cl. ........................................... 29/78; 29/80; 51/209 R; 51/362; 279/1 M
[58] Field of Search ................... 29/78, 80; 51/209 R, 51/362; 279/1 M

[56] References Cited

U.S. PATENT DOCUMENTS

| | | | |
|---|---|---|---|
| 3,165,813 | 1/1965 | Harvell et al. | 29/78 |
| 3,226,888 | 1/1966 | Erenyi | 51/362 |
| 4,507,897 | 4/1985 | Vieau et al. | 51/209 R |
| 4,598,916 | 2/1986 | McGehee | 279/1 M |
| 4,798,025 | 1/1989 | Lokken et al. | 51/168 |

*Primary Examiner*—William Terrell
*Attorney, Agent, or Firm*—Bacon & Thomas

[57] ABSTRACT

A disc-shaped rotary file, having a relatively flat operating surface with a curved outer periphery, is formed of ferromagnetic material and includes a plurality of cutting members. The rotary file also includes a second side opposite the operating surface and a number of stop members protruding therefrom. A complementary support member having a relatively flat surface and curved outer periphery is adapted to receive the rotary file superimposed thereon and includes one or more magnets to hold the rotary file in place. The support member also defines one or more depressions or slots for receiving the protruding stop members for preventing the rotation of the rotary file with respect to the support member and for rotation of the file when the support member is rotated.

7 Claims, 3 Drawing Sheets

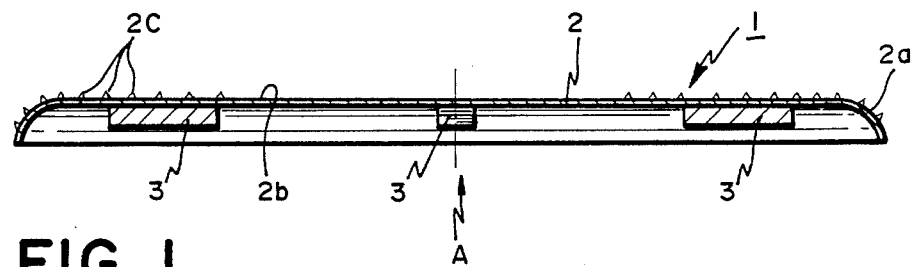
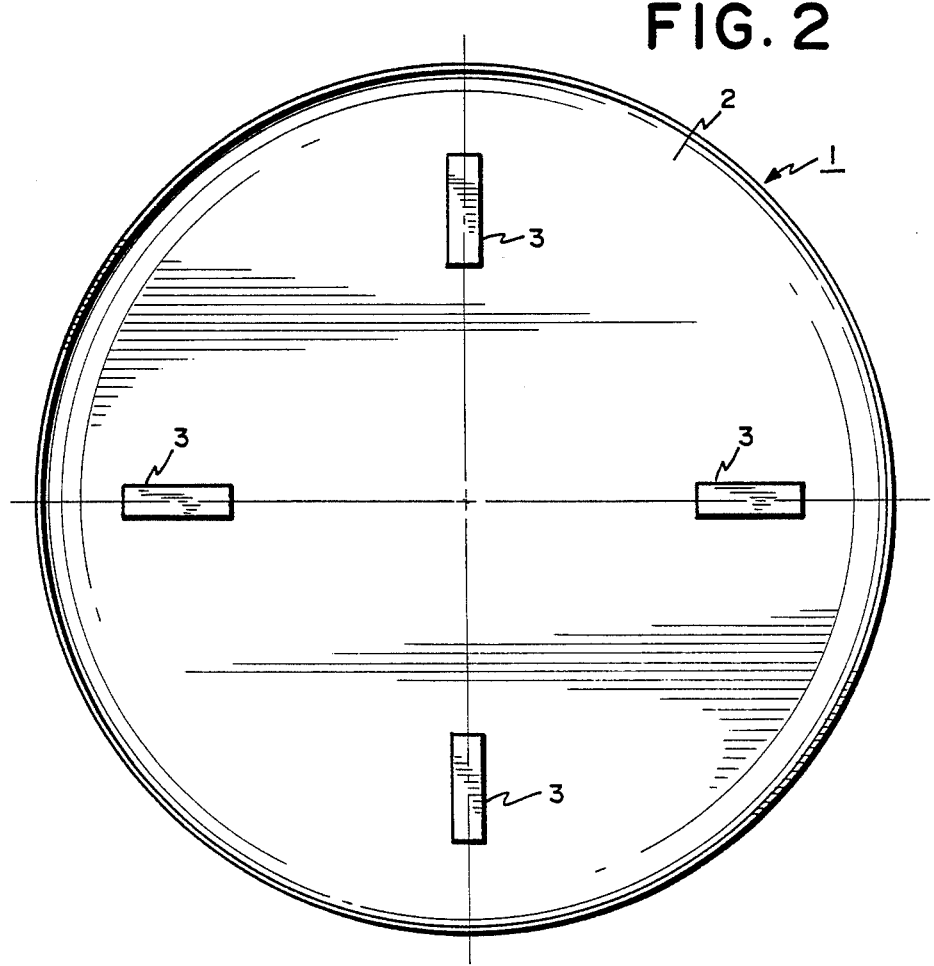

ROTARY FILE, SUPPORT MEMBER AND ABRASIVE DEVICE

BACKGROUND OF THE INVENTION

This invention relates to a cutting and/or abrading device and more particulatly to a rotary file formed of a magnetic material, a support member for supporting the rotary file and a rotatable device which has a disc or rotary file and mating support member which is adapted to receive the rotary file thereon.

Rotary or disc files for use in removing, by abrasion, fins from a workpiece generally have a flat disc-like shape and are mounted on a rotary support and shaft of an abrasion device by means of screws.

Such files have a flat disc-like shape and rely on the flat surface for filing. Therefore, such files cannot be readily used for removing fins formed in rounded portions of a workpiece. Such fins have thus been removed by means of a rod-like file or a grinding wheel having a rounded outer perihpery.

When a rod-like file is used for the removal of fins at rounded corners of a workpiece, it is usually necessary to conduct two operations separately, i.e., one for flat portions and one for the rounded corner portions. Thus multiple operating steps are required and, in case of using a ceramic grinding wheel, it is sometimes necessary to change the shape of the rounded portion of the outer periphery of the grinding wheel to conform to the rounded shape of the workpiece, thus encountering multiple operating steps. Moreover, since the shape of the rounded outer periphery of the grinding wheel gradually changes by abrasion during use, precise forming or so-called machining cannot be expected.

Further, since the known disc files are frequently secured to the rotary shaft by means of screws, it is sometimes difficult or troublesome to mount or dismount the disc file. Additionally, since the screws may protrude from the operating surface of the disc files, it may not be possible to use the entire operating surface of the file.

The present invention has been made with the foregoing problems in view and has, as its object, the provision of a disc or rotary file which allows efficient machining or a workpiece having rounded corners in a single operating step, which is easily mounted on or dismounted from a driving member, and which permits stable and steady abrading, cutting or metal removal for a long period of time. Another object of the present invention is to provide a supporting member for mounting the above disc file and to provide an abrasive device having the aforementioned disc file and the supporting member.

SUMMARY OF THE INVENTION

In accomplishing the foregoing objects, the present invention incorporates a disc or rotary file having a relatively flat disc-shaped body formed of a ferromagnetic material such as an iron alloy having a top operating surface with a relatively flat portion over a major portion thereof and a curved outer periphery. This upper or top surface includes a plurality of cutting members protruding therefrom. These cutting members are preferably integrally formed and are, therefore, an integral part of the shaped body. Stop means such as a plurality of rectangular blocks or keys protrude from the under side of the shaped body for preventing rotation of the file with respect to a supporting member.

In another aspect, the present invention contemplates a matching support member or plate for mating with the above disc file. The support member also defines a disc having a rounded outer periphery for complementarily receiving the rotary file thereon in a superimposed axially aligned relationship and has a magnet or magnets embedded in the support member. The magnet or magnets hold the disc file on the support member. The support member also defines one or more depressions or slots formed on the top surface thereof which are engageable with the stop means or keys of the disc.

In a further aspect, the present invention comtemplates an abrasive or cutting device comprising the above support member, drive means for rotating the support member, and cutting device or disc file magnetically secured to the support member.

In an abrasive device according to the present invention, a support member is rotated by drive means so that the disc file, which is supported and magnetically held thereon is rotated therewith and when pressed against a workpiece performs the desired abrasion work. Since the outer periphery of the disc file is rounded in shape, it is possible to abrade, file or to machine rounded portions of a workpiece. Thus, both the flat portions and the curved portions of the workpiece can be machined in one step, i.e., without changing the set-up of an automated process. Since the disc file is formed of a metal, abrasion of the file can be minimized and, thus, the rounded shape of the outer periphery of the disc file remains unchanged. This permits stable and reliable machining. In addition, since the disc or rotary file, which is formed of a ferromagnetic material, is secured to the supporting member by the magnets embedded in the supporting member, the disc file can be easily mounted on or dismounted from the support member. Also, since the disc file has stop keys engageable with depressions or slots formed in the support member or plate, the disc file is effectively prevented from moving with respect to the support member and is rotated therewith.

BRIEF DESCRIPTION OF THE DRAWINGS

FIG. 1 is a side view illustrating a disc file according to the present invention;

FIG. 2 is a plan view as seen in the direction of the arrow A in FIG. 1;

DETAILED DESCRIPTION OF A PREFERRED EMBODIMENT

Figure 3:
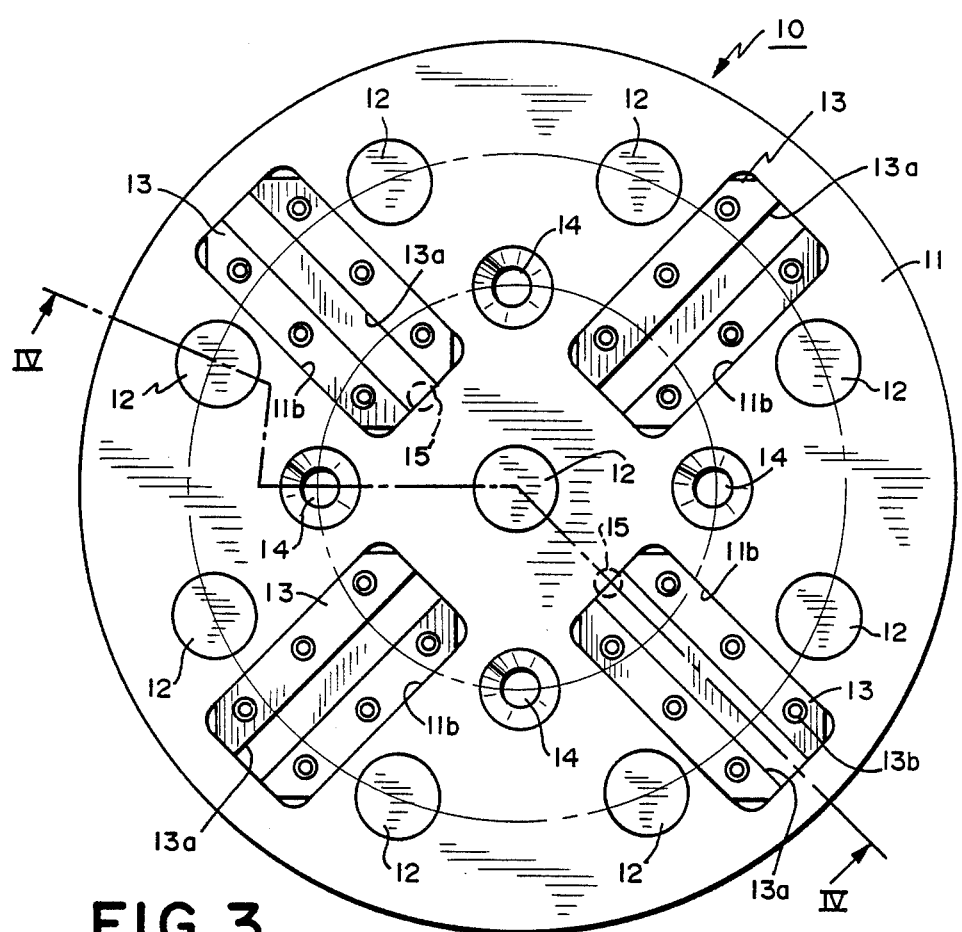
FIG. 3 is a plan view of a supporting member according to the present invention.

The present invention will now be described with reference to the accompanying drawings.

As illustrated in FIGS. 1 and 2, a disc file 1 comprises a disc-shaped file body 2 which is formed into a disc-like shape with four stop keys or disc stop elements 3 defined by or projecting from a backside surface. The file body 2 may be obtained by press molding of a ferromagnetic plate (a SUS plate having magneticity in the illustrated embodiment) or by other metal forming means.

The disc file also includes an outer periphery 2a of the file body which defines a convexly rounded shape of predetermined radius. An outer relatively flat surface 2b of the file body 2 includes a number of integrally-formed file blades or projections 2c. however, it should be recognized that the file body 2 could include abrasive particles or cutting members which are embedded in the surface as opposed to being integrally formed therewith.

Figure 4:
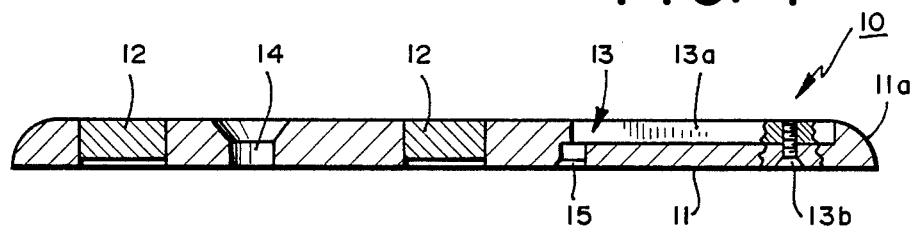
FIG. 4 is a cross section taken along the line IV—IV in FIG. 3.

In use, the disc file 1 is mounted on a supporting member or plate 10 which is illustrated in FIGS. 3 and 4. The supporting plate 10 has a complememting disc-like shaped supporting body 11 formed of alunimum or other suitable material. The supporting body 11 also includes a rounded outer periphery 11a having a radius which corresponds to the curved peripheral portion 2a of the disc file body 2. A plurality (a total of nine, in the illustrated embodiment) of columnar magnets 12 are embedded in the supporting body 11. One of the magents 12 is positioned at the center of the supporting body 11 while the other eight magnets are positioned radially outwardly therefrom and arranged in a circle closer to the periphery of the support plate 10 than the center thereof. Four rectangular grooves 11b are formed in or defined by the top or upper side of the supporting body 11, and angularly equally spaced apart from each other element engaging. Stop means or stop plates 13 made of iron or the like are inserted into each grove 11b and fixed thereto, i.e., to the supporting body 11 by screws 13b. Between each stop 13 is provided a center groove 13 a engageable with the stop key 3 of the above-described disc file 1. The supporting body 11 also includes four mounting holes 14 to be used in mounting the supporting plate 10 on a drive member described hereinafter and two holes 15 to be used for alignment or positioning purposes when assembled to an arbor as explained below.

Figure 6:
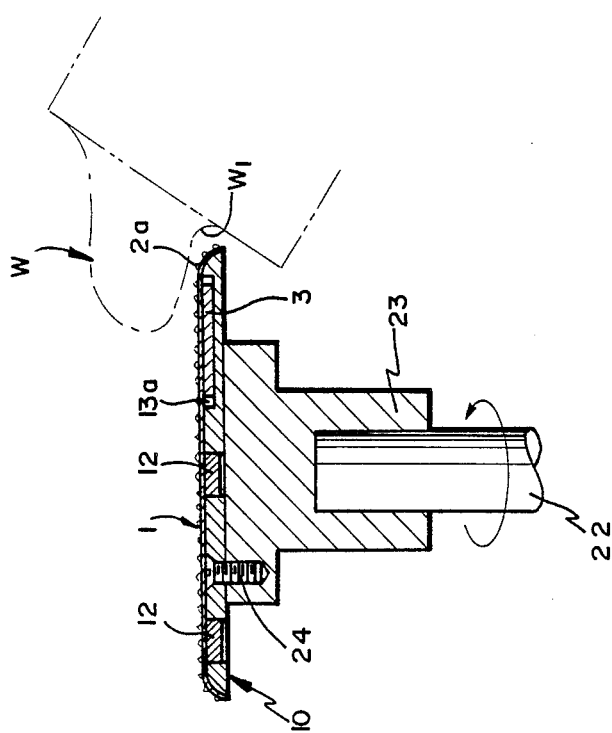
FIG. 6 is an enlarged side elevation showing details of a rotatable support member of the abrasive device.
Figure 5:
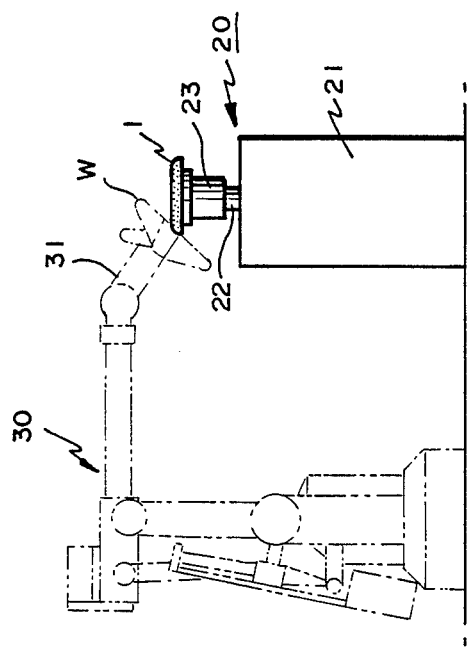
FIG. 5 is a side view of an abrasive device according to the present invention.

The above disc file 1 and the supporting plate 10 are used for constructing an abrasive device 20 as shown in FIGS. 5 and 6. FIG. 5 is a side view of the abrasive device 20 and FIG. 6 is an enlarged view showing the rotating part of the abrasive device 20. The abrasive device 20 has a base 21 from which a rotary shaft 22 extends vertically upwardly. The rotary shaft 22 has a lower end operatively connected to a drive means (not shown), such as a motor, accommodated within the base 21 and an upper end connected to an arbor support 23 in a manner which will be well understood by those skilled in the art.

The above-described supporting plate 10 is mounted on the top of the arbor 23. Thus, the arbor 23 has alignment pins (not shown) on its surface. The supporting plate 10 is placed on the flange at a position so that the alignment pins of the arbor 23 are inserted into the alignment holes 15 provided in the lower surface of the supporting body 11. Then, the supporting plate 10 is fixed to the fnalge 23 by four screws 24 which are inserted through the mounting holes 14 of the suppporting body 11.

The disc file 1 is then mounted on the supporting plate 10 in such a manner that the inner surface the disc covers the top surface of the supporting plate 10 therewith. In effect, the disc file 1 is superimposed on and in axial alignment with the supporting plate 10 in a so-called resting or mating relationship. When the disc file 1 is placed on the supporting plate 10 with its stop keys being engaged by the grooves 13a between the plates 13 provided in the supporting plate 10, the file body 2 is magnetically attracted to the magnets embedded in the supporting plate 10. Thus, the mounting of the disc file 1 on the supporting plate 10 can be easily effected. In the mounted state, the stop keys 3 are inserted into and engaged by the grooves 13a so the disc file 1 is prevented from rotating with respect to the support plate 10. The radially outer ends of the stop keys and the grooves 13a are disposed closer to the outer periphery of the disc than the disc center to positively drive the disc near its periphery.

Since the disc file 1 is secured to the support plate 10 merely by the magnetic force of the magents 12, the disc file 1 can be detached from the supporting plate 10 without difficulty.

In the abrasive device 20, when the rotary shaft 22 is driven, the supporting plate 10 is rotated together with the disc file 1. A workpiece W such as a propeller is secured to an edge of an arm 31 of a robot 30 and is forced to be engaged with the rotary file so that it is abraded or filed. In this case, by forcing a rounded portion $W_1$ of the workpiece W against the curved portion 2a of the outer periphery of the disc file 2, this portion $W_1$ can be machined. Thus, using the same disc file 1, the machining of both the rounded corner portion $W_1$ and the flat portion of the workpiece W can be made in one step, i.e., without changing the machine set-up. Since there are no protruding portions of mounting screws in the outer surface of the disc file 1, the entire surface thereof can be effectively utilized as the operating surface. In other words, the entire surface can be used as an operating surface because there is no lost area for mounting screws or the like. Further, since the disc file 1 is formed of a metal, wear or abrasion of the file is minimized so that the radius of the curved outer periphery 2a of the file body 2 remains relatively unchanged, permitting stable and precise machining for a relatively long period of time.

Therefore, machining operations inclusive of machining of rounded corners of a workpiece can be efficiently effected with a single set-up of automated equipment, and thus reducing the number of machining steps. And further, the disc file can be easily attached or detached and precise and reliable abrasive operations can be done.

While the invention has been described in connection with the accompanying drawings, it should be understood that changes and modifications may be made without departing from the scope of the appended claims.

What is claimed is:

1. An abrasive rotary disc assembly arranged to be rotated about a central rotational axis and comprising:

a ferromagnetic abrasive disc having an outer surface including cutting elements thereon, said outer surface being centrally planar and having a convexly curved radially outer periphery, said periphery including at least a portion of said cutting elements thereon, and an inner surface extending substantially parallel to said outer surface at least at said periphery, said inner surface including circumferentially spaced, axially projecting disc stop elements disposed between the center of the disc and said curved periphery;

a support member for said disc having an outer surface corresponding geometrically to said inner surface, including a convexly curved radially outer periphery corresponding in shape to said disc inner surface at the disc periphery, said support member including curcumferentially spaced stop engaging means for cooperating with said disc stop elements to prevent relative rotation between said disc and said support member, and magnetic elements arranged to attract said inner surface of said ferromagnetic disc to the outer surface of the support member;

said disc inner surface engaging said support member outer surface in contiguous relationship with said disc inner surface at the disc periphery contiguous with the convexly curved periphery of the support member, with said disc stop elements engaging said support stop means and said magnetic elements solely retaining said disc axially against said support member;

said disc stop elements and said support stop means comprising cooperating radially extending grooves and projections, with at least the radially outer ends of the grooves and projections disposed closer to the disc periphery than the disc center.

2. An abrasive rotary disc assembly as claimed in claim 1, wherein said disc stop elements comprise axially and radially extending projections and said support stop means comprising axially and radially extending grooves.

3. An abrasive rotary disc assembly as claimed in either claim 1 or 2, wherein said support means is non-magnetic, and said support stop means are magentic.

4. An abrasive rotary disc assembly as claimed in claim 3, wherein said support member is aluminum and said support stop means comprises ferrous metal inserts in the outer surface of said support member, said inserts defining means for cooperating with said disc stop elements to prevent relative rotation between said disc and support member.

5. An abrasive rotary disc assembly as claimed in claim 1, wherein said magnetic elements include a centrally located magnet and circumferentially spaced magnets disposed closer to the periphery of the support member than the center thereof.

6. An abrasive rotary disc assembly as claimed in claim 5, said support member including alignment means for aligning the support member relative to said arbor.

7. An abrasive rotary disc assembly as claimed in claim 1, including a rotary arbor element, said support member secured to said rotary arbor element by fastener means, said fastener means extending from the outer surface of the support member to the arbor, but not projecting above said support member outer surface.

* * * * *